United States Patent [19]

Mansfield

[11] 4,064,625
[45] Dec. 27, 1977

[54] FUNCTIONAL APPARATUS AID

[76] Inventor: Henry Timothy Mansfield, P. O. Box 434, Barnwell, S.C. 29812

[21] Appl. No.: 635,255

[22] Filed: Nov. 25, 1975

[51] Int. Cl.² ............................................. B26B 21/40
[52] U.S. Cl. ........................................ 30/90; 248/121; 248/262; 30/296 R; 269/239
[58] Field of Search .......................... 30/90, 296 R, 43; 248/176, 177, 187, 121, 122, 206 R, 316 R, 316 B, 316 C, 314, 362; 128/24 R; 269/239, 45

[56] References Cited

U.S. PATENT DOCUMENTS

| 1,138,417 | 5/1915 | Rottenburg | 248/187 X |
| 1,809,774 | 9/1931 | Coates | 269/239 X |
| 2,085,651 | 6/1937 | Greve | 248/122 |
| 2,329,891 | 9/1943 | Gantner | 30/90 |
| 2,911,982 | 11/1959 | Guden | 248/122 X |
| 3,276,734 | 10/1966 | Goldblatt | 248/176 |
| 3,399,675 | 9/1968 | Hill | 248/316 R |
| 3,750,991 | 8/1973 | Ragir | 248/206 R |

OTHER PUBLICATIONS

The Sunday Star Magazine, Washington, D.C., Jan. 26, 1958.

Primary Examiner—Gary L. Smith
Attorney, Agent, or Firm—Larry Harold Kline

[57] ABSTRACT

A device is disclosed for use with a functional apparatus which comprises holding means operative to hold the functional apparatus and stabilizing means operative to secure the holding means in a stable position whereby the functional apparatus may be utilized without being held in the hands of the user.

35 Claims, 4 Drawing Figures

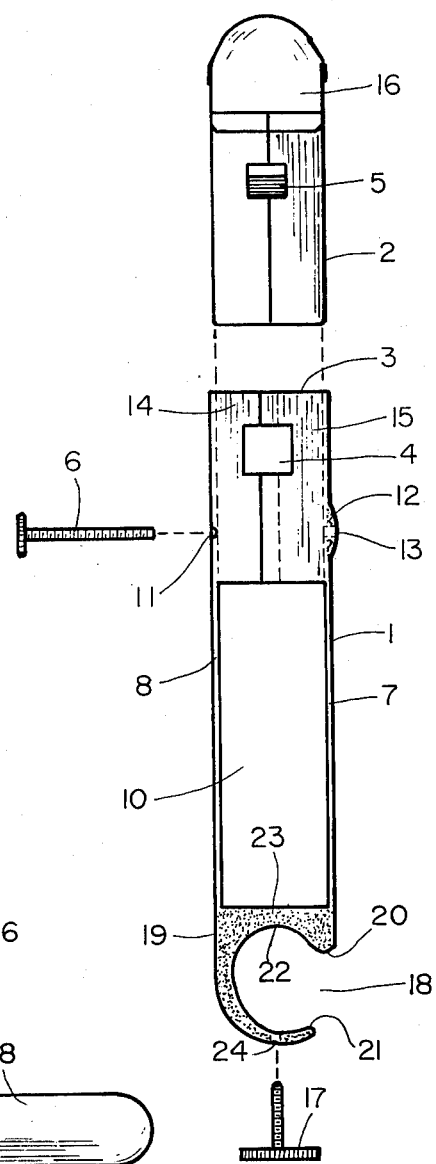
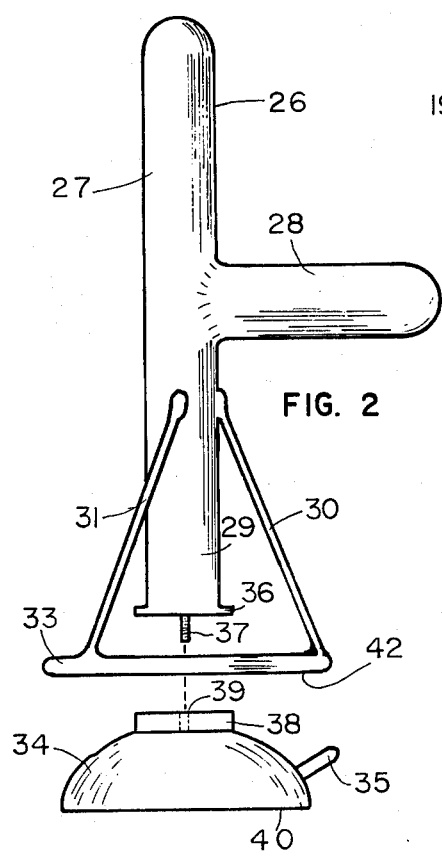
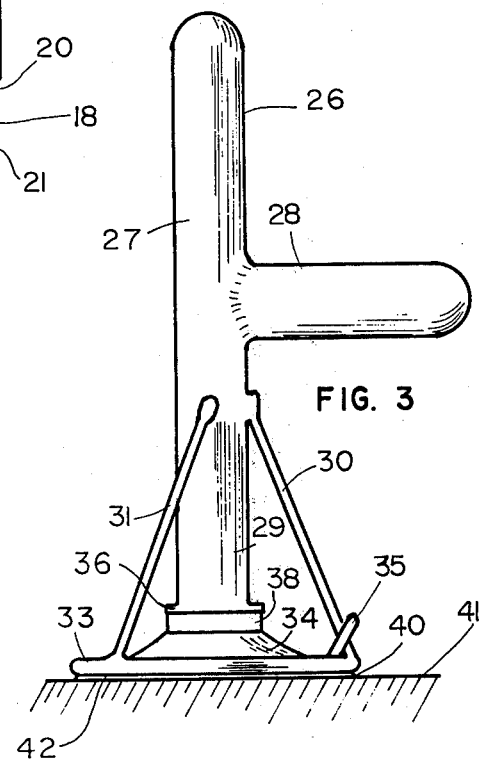
FIG. 1
FIG. 2
FIG. 3

FUNCTIONAL APPARATUS AID

The invention relates to a functional apparatus aid and more particularly to an aid which can be utilized by a person without the use of his limbs.

Many persons, unfortunately, do not have full use of their limbs. Many diseases and injuries create handicaps which need to be overcome, if possible. The present invention specifically solves the problem of a man who would like to shave, but does not have full use of his limbs. By utilizing the present invention, the man can overcome his handicap with only a slight amount of help and enjoy the pleasure and accomplishment of shaving himself. Other functional equipment can also be similarly utilized by use of the present invention.

An object of this invention is to provide a functional apparatus aid which can be utilized by a person who has limited or no use of his limbs.

Another object of this invention is to provide a functional apparatus aid which can be stabilized on various surfaces.

A further object of this invention is to provide a shaving aid for persons without use of their limbs that can be utilized at various angles by the person being shaved.

Another object of this invention is to provide a shaving aid that can be held by a man between his legs.

Another object of this invention is to provide a multiplicity of pressure points on a shaving aid, so that a man can have a good grip on the shaving aid when held between his legs.

Still another object of this invention is to provide a support device which can support various functional equipment which might then be utilized with limited or no use of the user's limbs.

Another object of this invention is to provide a remote switch for a shaving aid which would enable a person who has partial use of his limbs to control the on-off function of the shaver.

These and other objects and features of the invention will be apparent from the following description and appended claims.

Briefly, the invention is a device for use with a functional apparatus comprising holding means and stabilizing means. The functional apparatus may be utilized without being held in the hands of the user. The holding means comprises a structure containing an opening within which the functional apparatus may be held. The structure comprises a plurality of sides surrounding the opening and overlapping members comprises one of the plurality of sides. The holding means further comprises securing means, which may be a screw, operative to secure the functional apparatus in the opening. The screw may extend from one of the sides to another of the sides and operate to vary the amount of overlapping in the overlapping members, thereby tightening or loosening the pressure of the structure around the functional apparatus. The screw may extend through a second of the plurality of sides, and through a third side. The third side may have a built-up area with a threaded portion operative to receive the screw. The stabilizing means may comprise an extended portion of the structure which is operative to be held between the legs of the user. The extended portion of the structure may comprise two sides with each of the two sides having two edges with a void between. When the user holds the extended portion of the structure between his legs, the edge from each of the two sides may press against each leg of the user, providing greater stability. The stabilizing means may also comprise support means and attaching means operative to attach the device to the support means. The support means may comprise suction means operative to create a suction force on a surface and bar means attached to a suction means. The support means may further comprise a ring stabilizer, comprising a stabilizer ring and a plurality of stabilizing rods attached to the bar means. The bar means may comprise a vertical bar, a horizontal bar attached to the vertical bar, and a support bar which is the lower portion of the vertical bar. The plurality of stabilizing rods may be attached to the support bar. A support base may be secured to the bottom of the support bar. The suction means may comprise a suction cup, a suction release tab, and a suction cup top containing a threaded hole. The support base may contain a screw which is operative to be screwed into the threaded hole in the suction cup top. The support base and the suction cup top may have the same diameter. The diameter of the stabilizing ring may be greater than the diameter of the suction means. The stabilizing ring may be located so that when the suction means is pressed onto the surface, the stabilizing ring is close enough to the surface to stabilize and balance the device. The attaching means may comprise a base; an arcular piece, with an opening, emanating from said base; and fastening means operative to fasten the support means within the opening in the arcular piece. The diameter of the base means may be slightly less than the opening in the arcular piece. The base means, for example the horizontal bar or vertical bar, may fit into the opening and be secured by the fastening means. The fastening means may comprise a screw which extends from a portion of the arcular piece and presses against the bar means. The functional apparatus may be a shaver. The support means may be utilized to support any device for any desired function.

The invention will be more fully understood from the following detailed description and appended claims when taken with the drawings in which:

FIG. 1 is an exploded view of a functional apparatus which is a shaving aid 1 and shaver 2.

FIG. 2 is an exploded view of a functional apparatus support which is a shaving aid support 26.

FIG. 3 is a view of shaving aid support 26 pressed on a flat surface.

Figure 4:
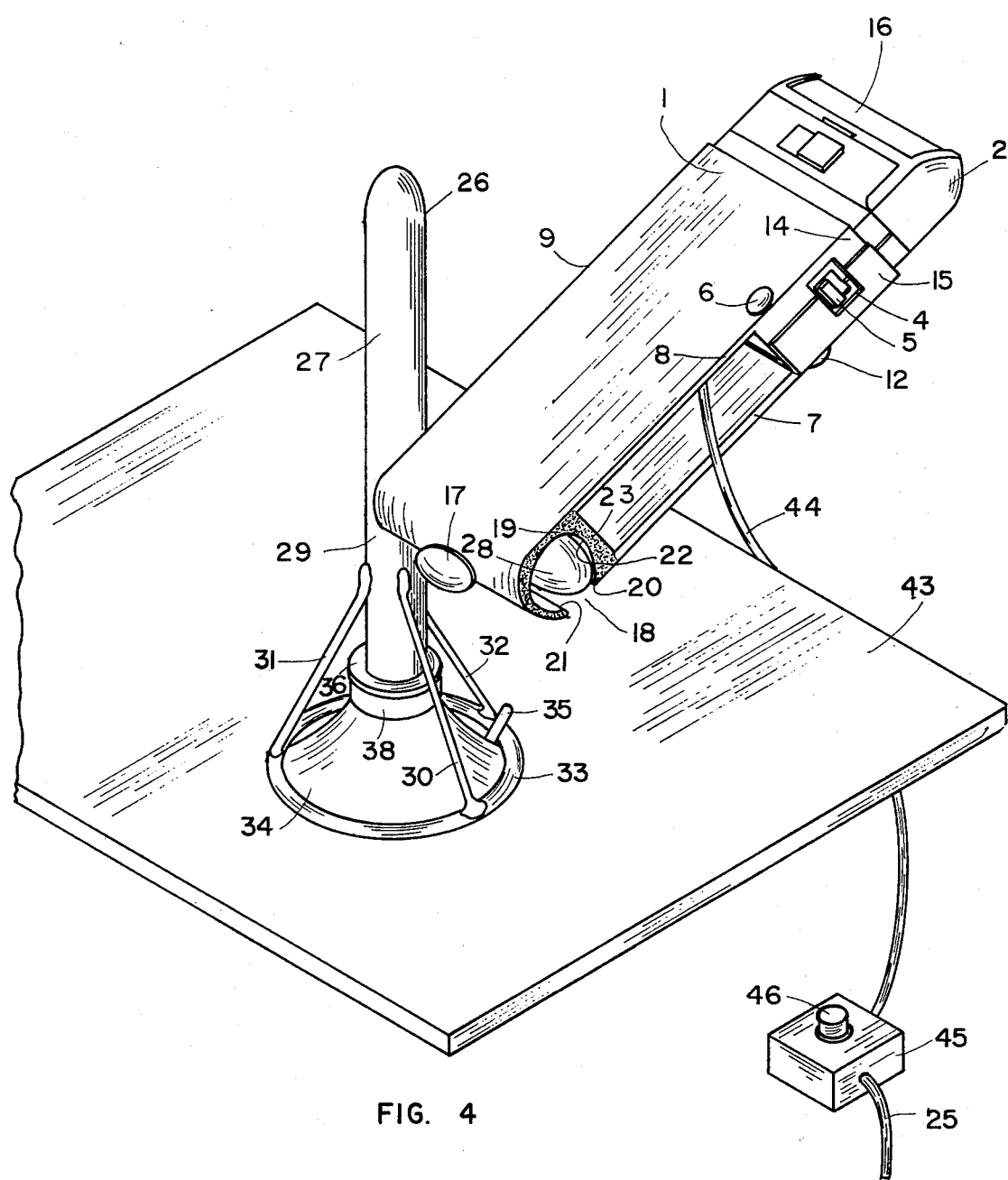
FIG. 4 is an isometric view of the shaving aid support 26 supporting shaving aid 1 on a table.

Referring now to the drawings, FIG. 1 shows an exploded view of a functional apparatus which is a shaving aid 1 and the shaver 2. The shaver 2 is shown with shaving head 16 and shaver switch 5 as in any ordinary electric shaver.

The shaver 2 may be inserted into the top opening 3 of the shaving aid 1, and then may be secured therein by the use of screw 6. Screw 6 is inserted through hole 11 into threaded hole 13 which is in the built-up area 12.

The functional apparatus, or shaving aid 1, comprises holding means operative to hold the functional apparatus and stabilizing means operative to secure the holding means in a stable position. The holding means comprises a structure containing an opening, which is top opening 3. The structure comprises a plurality of sides surrounding top opening 3. Overlapping members 14 and 15 comprise one of a plurality of sides comprising the structure. The functional apparatus, or shaving aid 1, is held by securing means which comprises screw 6, which extends through an opening in one of a plurality of sides, and is operative to vary the amount of overlapping in overlapping members 14 and 15. Turning screw 6 enables the user to tighten or loosen the pressure of the structure around top opening 3 where the functional apparatus, or shaving aid 1, may be held.

Overlapping members 14 and overlapping members 15 are pressed together by the tightening of screw 6 and thereby cause the upper portion of shaving aid 1 to press against shaver 2 and secure it to the top opening 3 of shaving aid 1. The shaver 2 may be released from the shaving aid 1 by unscrewing screw 6 and thereby releasing the pressure of the shaver 2 and allowing it to be removed from shaving aid 1.

Shaving aid 1 further comprises a center section which contains a void 10 within two sides, one side having edges 8 and 9 and the other side having edge 7 and an edge not shown.

The stabilizing means may comprise an extended portion of the structure which is operative to be held between the legs of the user.

Shaving aid 1 may, therefore, be supported by a person between his legs. The four edges, 7, 8 and 9 and the one not shown, give greater stability to the holder of the shaving aid 1 by giving more pressure points and thereby a better grip so that the person holding the shaving aid 1 between his legs will be less likely to have it slip.

When the user holds the extended portion of the structure between his legs, one edge from each of the two sides will press against each leg of the user, providing greater stability for the device.

FIG. 2 shows an exploded view of a functional apparatus support, shaving aid support 26. Vertical bar 27 and horizontal bar 28 on shaving aid support 26 are similar bars to those which can be found in a hospital as a bedrail or guardrail or on an I.V. stand.

The stabilizing means may also comprise support means operative to support the device and attaching means operative to attach the device to the support means. The support means may comprise suction means, operative to create a suction force on a surface, and bar means attached to the suction means.

The suction means may comprise suction cup 34, suction release tap 35, and suction cup top 38 containing threaded hole 39.

The support means may further comprise a ring stabilizer comprising stabilizing ring 33 and a plurality of stabilizing rods such as stabilizing rods 30, 31 and 32.

The bar means may comprise a vertical bar 27, a horizontal bar 28, permanently attached to vertical bar 27, and a support bar 29, which is the lower portion of the vertical bar 27 below horizontal bar 28.

The attaching means may comprise a base 23, an arcular piece 19, with an opening 18, emanating from base 23, and fastening means operative to fasten the support means within the opening of the arcular piece. The fastening means may be screw 17 extending through threaded hole 24 to press against the bar means in side opening 18. Any other fastening means would be within the scope of the invention. It is important that the fastening means hold the device securely.

The shaving aid 1 may be secured onto bars or rails similar to vertical bar 27 and horizontal bar 28 by use of fastening means such as screw 17. The bar like vertical bar 27 and horizontal bar 28 can be placed through opening 18 in shaving aid 1. The diameter of the bar used is slightly less than the distance between edge 20 and edge 21 of arcular piece 19. The concave surface 22 conforms to the circumference of the bar such as vertical bar 27 and horizontal bar 28. Arcular piece 19 has a strengthened base 23. Attaching screw 17 attaches through threaded hole 24 and presses against the bar which has been placed through opening 18. By use of attaching screw 17 and the strengthened base 23, the shaving aid 1 may be securely attached to the bar. By using opening 18, the shaving aid 1 may be attached to many different supports such as a bedrail, guardrail and an I.V. stand. By use of shaving aid support 26, the shaving aid 1 may be attached to many other surfaces including a mirror, a table, a wall, a desk, a dresser, a wheelchair or any flat surface.

FIG. 3 shows a view of shaving aid support 26 pressed on a flat surface 41. Referring to FIGS. 2, 3 and 4, stabilizing rods 30, 31 and 32 are connected from support ring 33 to support bar 29, which is the lower portion of vertical bar 27.

Suction cup 34, with suction surface 40, is attached to support base 36 and screw 37 which is mounted in support base 36. Suction cup 34 has a suction release tab 35 to aid in releasing the suction when desired.

Screw 37 is secured in threaded hole 39 in suction cup top 38. Bottom surface 42 of support ring 33 acts to support whatever is attached to the shaving aid support 26, when the suction cup 34 is pressed onto a surface. The support ring 33 enables the shaving aid support 26 to be balanced and to solve any equilibrium problems with regard to any unit that is attached to the shaving aid support 26.

The clearance between the bottom surface 42 of support ring 33 and the suction surface 40 of the suction cup 34 is critical. The distance should be such that the entire suction surface is usable and that the bottom surface 42 of support ring 33 is close enough to the flat surface 41 in order to stabilize the unit.

It is recommended that Support Base 36 be the same diameter as suction cup top 38 in order to fully utilize the holding power of the suction cup 34.

FIG. 4 shows an isometric view of the shaving aid support 26 supporting shaving aid 1 on tabletop 43. FIG. 4 shows the shaving aid 1 secured to the horizontal bar 28 of shaving aid support 26.

Electrical cord 44 leads from shaver 2 to remote switch 45. Remote switch 45 contains an on-off button 46 so that the shaver 2 may be controlled without use of the hands. Electrical cord 25 leads from remote switch 45 to an electrical power source. The shaver 2 may, of course, be cordless or may not have the remote switch 45.

Shaving aid support 26 may be used not only as a shaving aid support, but as a universal support for many pieces of equipment which can be attached thereon. There are many devices which can utilize support 26 and/or shaving aid 1. For example, an electric toothbrush, massager, dryer or dispenser, or other devices could be inserted in top opening 3 of shaving aid 1, secured therein, and utilized in a similar manner as explained herein. Also, other devices could be utilized which could be attached to support 26, without using aid 1, to perform various desired functions.

The present invention can be utilized by a person who has limited or no use of his limbs. In the case of a man with no use of his arms or legs, the shaving aid and support can be set-up and turned on by a nurse. The man, if he can move his head, can still control the shaving functions.

If a man has partial use of a limb, such as his leg, the remote switch can be set-up so that he can turn the shaver on and off to shave at his own convenience. The man can also support the shaving aid between his legs.

The present invention can also be utilized by many other persons who might wish to support any device without the use of his limbs. Non-handicapped persons may wish to shave or perform other functions utilizing this invention.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

I claim:

1. A device for use with an apparatus comprising:
   a. holding means operative to hold said apparatus;
   b. stabilizing means operative to secure said holding means in a stable position, said stabilizing means comprising support means operative to support said device, and attaching means operative to attach said device to said support means; said attaching means comprising a base; a single continuous arcular piece, with an opening, emanating from said base; and fastening means extending through said arcular piece operative to fasten said support means within said opening in said arcular piece; and
   c. wherein said holding means comprises a structure containing an opening within which said apparatus may be held, said structure comprising a plurality of sides surrounding said opening in which said apparatus may be held, and overlapping members comprising one of said plurality of sides.

2. A device for use with an apparatus according to claim 1 wherein said holding means further comprises securing means operative to secure said apparatus in said opening in said structure.

3. A device for use with an apparatus according to claim 2 wherein said securing means comprises a screw extending through said opening in said structure adjacent to said one of said plurality of sides, operative to vary the amount of overlapping in said overlapping members and thereby to tighten or loosen the pressure of said structure around said apparatus which may be held in said structure.

4. A device for use with an apparatus according to claim 3 wherein said apparatus is a shaver.

5. A device for use with an apparatus according to claim 4 further comprising a remote switch whereby the user of said shaver may control said shaver's on-off function by partial use of the user's limbs.

6. A device for use with an apparatus according to claim 1 wherein said apparatus is a shaver.

7. A device for use with an apparatus according to claim 3 wherein said screw extends through a second of said plurality of sides and through a third of said plurality of sides.

8. A device for use with an apparatus according to claim 7 wherein said third of said plurality of sides has a built-up area which has a threaded portion and is operative to receive and secure said screw.

9. A device for use with an apparatus comprising:
   a. holding means operative to hold said apparatus comprising a structure within which said apparatus may be held;
   b. stabilizing means operative to secure said holding means in a stable position, said stabilizing means comprising support means operative to support said device, and attaching means operative to attach said device to said support means; said attaching means comprising a base on said structure; a single continuous arcular piece, with an opening, emanating from said base; and fastening means extending through said arcular piece operative to fasten said support means within said opening in said arcular piece; and
   c. wherein said support means comprises suction means operative to create a suction force on a surface and bar means extending vertically from and attached to said suction means.

10. A device for use with an apparatus according to claim 9 wherein said support means further comprises means to stabilize said suction means including a ring stabilizer comprising a stabilizing ring and a plurality of stabilizing rods attached to said bar means, said ring stabilizer surrounding the outer perimeter of the suction means.

11. A device for use with an apparatus according to claim 9 wherein said apparatus is a shaver.

12. A device for use with an apparatus according to claim 9 wherein said structure comprises:
   a. a plurality of sides surrounding said opening in which said apparatus may be held; and
   b. overlapping members comprising one of said plurality of sides.

13. A device for use with an apparatus according to claim 12 wherein said holding means further comprises securing means operative to secure said apparatus in said opening in said structure.

14. A device for use with an apparatus according to claim 13 wherein said securing means comprises a screw extending through said opening in said structure adjacent to said one of said plurality of sides, operative to vary the amount of overlapping in said overlapping members, and thereby to tighten or loosen the pressure of said structure around said apparatus which may be held in said structure.

15. A device for use with an apparatus according to claim 14 wherein said screw extends through a second of said plurality of sides and through a third of said plurality of sides.

16. A device for use with an apparatus according to claim 15 wherein said third of said plurality of sides has a built-up area which has a threaded portion and is operative to receive and secure said screw.

17. A device for use with an apparatus according to claim 10 wherein said bar means comprises a vertical bar, a horizontal bar permanently attached to said vertical bar, and a support bar which is the lower portion of said vertical bar below said horizontal bar.

18. A device for use with an apparatus according to claim 17 wherein said plurality of stabilizing rods are attached to said support bar.

19. A device for use with an apparatus according to claim 18 wherein said support means further comprises a support base secured to the bottom of said support bar.

20. A device for use with an apparatus according to claim 18 wherein said suction means comprises:
   a. a suction cup; and
   b. a suction release tab secured on said suction cup; and c. a suction cup top containing a threaded hole and permanently attached to said suction cup.

21. A device for use with an apparatus according to claim 20 wherein said support base contains a screw mounted within said support base which is operative to be screwed into said threaded hole, thereby attaching said suction means to said bar means.

22. A device for use with an apparatus according to claim 21 wherein said support base and said suction cup top have the same diameter.

23. A device for use with an apparatus according to claim 17 wherein the diameter of said stabilizing ring is greater than the diameter of said suction means.

24. A device for use with an apparatus according to claim 17 wherein the diameter of said bar means is slightly less than the diameter of the opening in said arcular piece, whereby said bar means may fit into said opening and be secured by said fastening means.

25. A device for use with an apparatus according to claim 17 wherein the diameter of said horizontal bar is slightly less than the diameter of the opening in said arcular piece, whereby said horizontal bar may fit into said opening and be secured by said fastening means.

26. A device for use with an apparatus according to claim 24 wherein said apparatus is a shaver.

27. A device for use with an apparatus according to claim 18 wherein fastening means comprises a screw which extends from a portion of said arcular piece and presses against said bar means.

28. An apparatus to support a device comprising:
 a. suction means operative to create a suction force on a surface;
 b. bar means extending vertically from and attached to said suction means; and
 c. means to stabilize said suction means including a ring stabilizer comprising a stabilizing ring and a plurality of stabilizing rods attached to said bar means, said ring stabilizer surrounding the outer perimeter of the suction means.

29. An apparatus according to claim 28 wherein said bar means comprises a vertical bar, a horizontal bar permanently attached to said vertical bar, and a support bar which is the lower portion of said vertical bar below said horizontal bar.

30. An apparatus according to claim 29 wherein said plurality of stabilizing rods are attached to said support bar.

31. An apparatus according to claim 30 wherein said support means further comprises a support base secured to the bottom of said support bar.

32. An apparatus according to claim 30 wherein said suction means comprises:
 a. a suction cup; and
 b. a suction release tab secured on said suction cup; and
 c. a suction cup top containing a threaded hole and permanently attached to said suction cup.

33. An apparatus according to claim 32 wherein said support base contains a screw mounted within said support base which is operative to be screwed into said threaded hole, thereby attaching said suction means to said bar means.

34. An apparatus according to claim 33 wherein said support base and said suction cup top have the same diameter.

35. An apparatus according to claim 29 wherein said stabilizing ring is located so that when said suction means is pressed onto said surface, said stabilizing ring is close enough to said surface to stabilize and balance said device being supported.

* * * * *